UNITED STATES PATENT OFFICE.

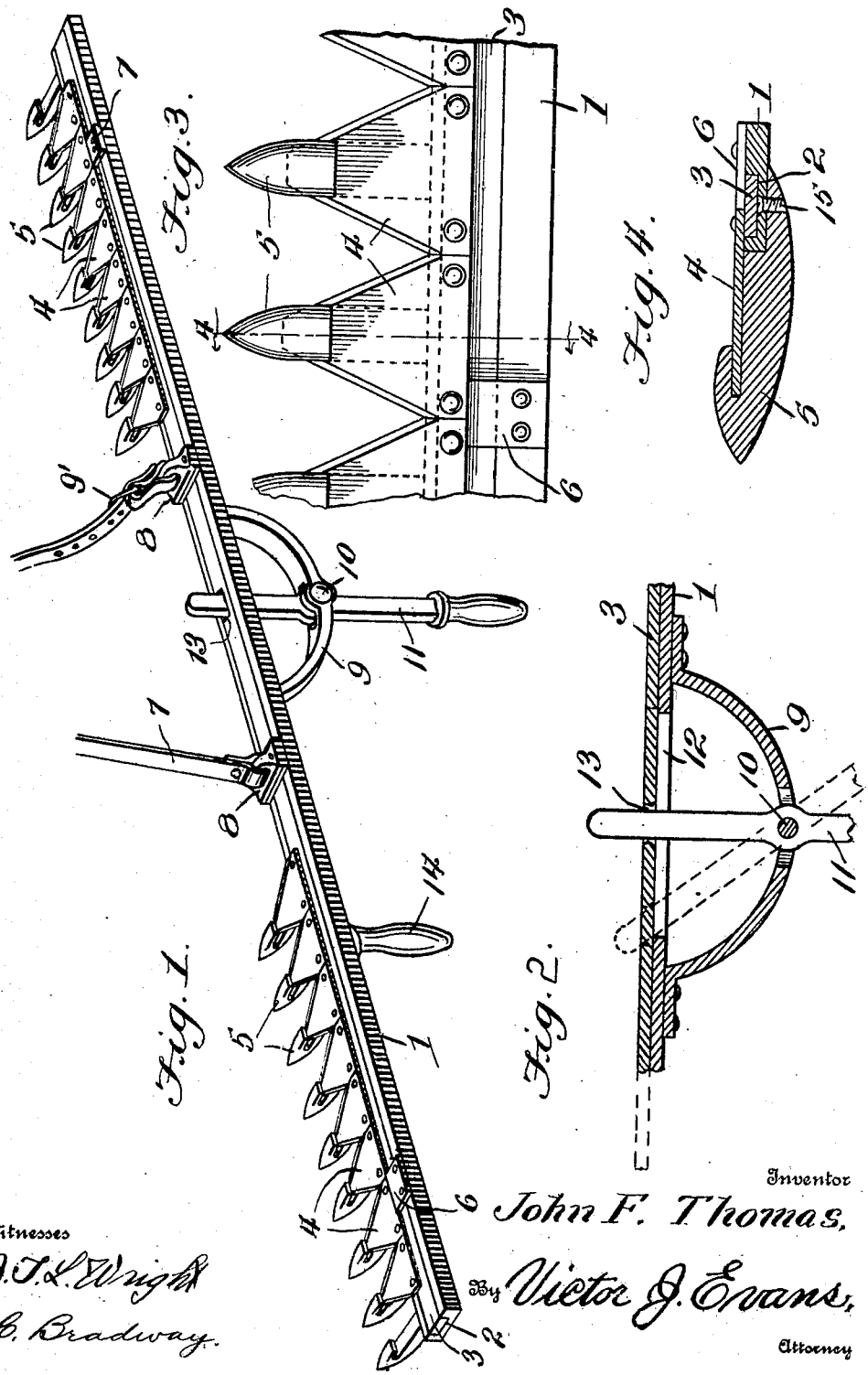

JOHN F. THOMAS, OF MARIANNA, ARKANSAS.

COTTON-TOPPER.

No. 916,628.  Specification of Letters Patent.  Patented March 30, 1909.

Application filed December 15, 1908. Serial No. 467,628.

*To all whom it may concern:*

Be it known that I, JOHN F. THOMAS, a citizen of the United States, residing at Marianna, in the county of Lee and State of Arkansas, have invented new and useful Improvements in Cotton-Toppers, of which the following is a specification.

This invention relates to cotton topping machines of the manual type which is designed for topping two rows at a time.

The invention has for one of its objects to improve and simplify the construction of devices of this character so as to be comparatively simple and inexpensive to manufacture, reliable and efficient in use, and readily manipulated.

Another object of the invention is the provision of a cotton-topping device whereby the operator can conveniently carry the machine in position to cut the plants at the right height while traveling between the rows, the cutters of the device being so arranged as to top two or more rows at one time.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a perspective view of the device. Fig. 2 is a detail sectional view showing the lever for operating the cutter bar. Fig. 3 is a fragmentary plan view showing the cutters. Fig. 4 is a transverse section on line 4—4, Fig. 3.

Similar reference characters are employed to designate corresponding parts throughout the views.

Referring to the drawing, 1 designates a guide or supporting bar which is of sufficient length as to extend across these two rows of plants while held in a direction transversely to the length of the rows and the top surface of this bar is provided with a longitudinal channel 2 in which reciprocates a cutter bar 3 which is substantially coextensive with the supporting bar 1. Secured to the reciprocatory bar 3 adjacent the ends thereof are cutters 4 such as are commonly employed in mowing machines, the cutters being protected by forwardly-extending fingers 5 fixed on the bar 1. The reciprocatory bar 3 is held within the guideway or channel 2 by retaining plates 6.

The device is adapted to be supported by a strap 7 which passes over the shoulder of the operator and the ends of which are secured to blocks 8 fastened to the bar 1, which blocks coöperate with the plate 6 to retain the bar 3 in the channel 2. The strap 7 has a buckle 9′ so that it can be lengthened or shortened to adjust the device at the proper height on the body of the operator. On the bottom side of the bar 1 is a central bracket 9 on which is fulcrumed, at 10, an operating lever 11. The upper end of the lever passes through a slot 12 in the bar 1 and loosely engages in an opening 13 in the cutter bar 3. By the oscillation of the lever 11, the cutter bar 3 is reciprocated. The operator steadies the device by means of a handle or grip 14 located at one side of the operating lever whereby the device can be held more readily in a horizontal position for topping two or more rows at a time. The fingers 5, as shown in Fig. 4, are secured to the bar 1 by screws 15 that are arranged in the bottom of the channel 2 and these screws are prevented from working loose by the cutter bar 3 which covers them.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim is:—

1. In a device of the class described, the combination of a supporting bar having a longitudinal channel and provided with a central longitudinally-extending slot in the bottom of the channel, a bracket secured to the bar adjacent the center thereof, a cutter bar mounted in the channel for reciprocation, a lever mounted on the bracket and connected with the cutter bar for actuating the same, and means for manually carrying the device in operative position.

2. A device of the class described comprising a channel-supporting bar, a cutter bar slidably mounted therein, cutters thereon, guard fingers on the supporting bar, a lever mounted at the center of the supporting bar, a handle at one side of the lever and secured to the supporting bar for steadying the device, said cutter bar having an opening in which one end of the lever loosely engages for reciprocating the cutter bar, and means for supporting the device on the body of the operator.

3. The combination of a channel-supporting bar having apertures in its channel, fingers extending forwardly from the bar, screws disposed in the apertures for securing the fingers to the bar and having their heads countersunk in the bottom of the channel, a cutter bar arranged in the channel of the supporting bar and covering the screws to prevent the same from working loose, means for retaining the cutter bar in the supporting bar, cutters on the cutter bar, a device for reciprocating the cutter bar, and a strap for supporting the apparatus on the body of the operator.

In testimony whereof I affix my signature in presence of two witnesses.

JOHN F. THOMAS.

Witnesses:
W. P. HARRIS,
G. H. WICHY.